Aug. 15, 1950          F. A. KING          2,518,903
FISH REEL SPOOL MOUNTING
Original Filed April 21, 1945                 2 Sheets-Sheet 1
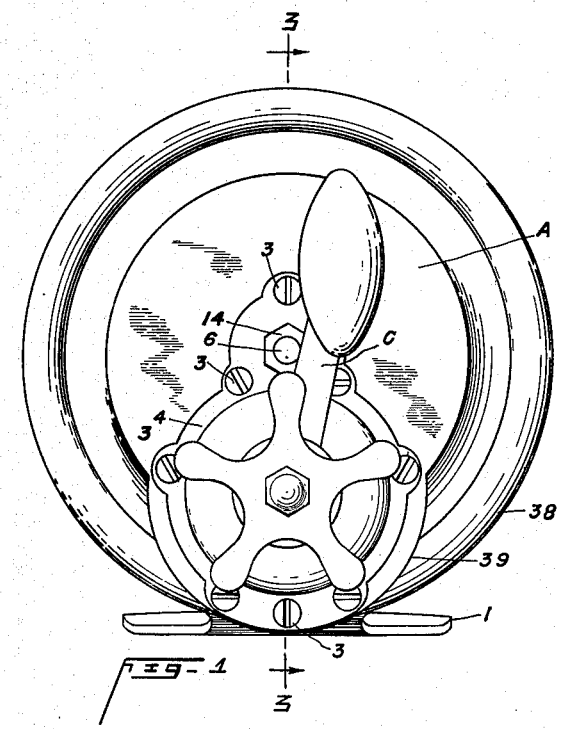
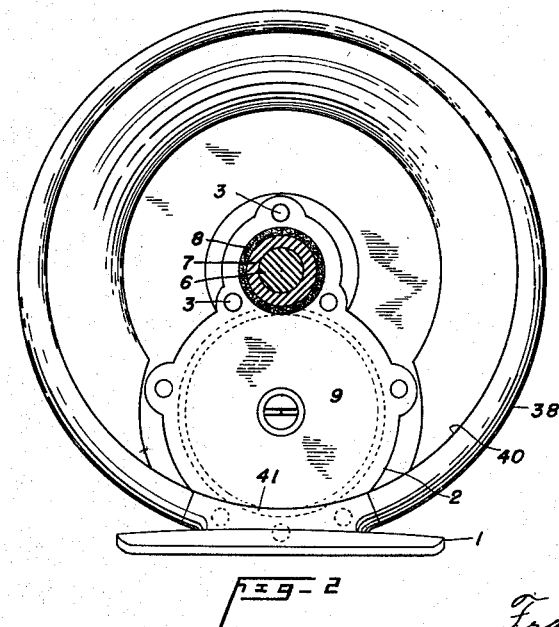
INVENTOR.
Frank A. King Aug. 15, 1950     F. A. KING     2,518,903
FISH REEL SPOOL MOUNTING
Original Filed April 21, 1945     2 Sheets-Sheet 2
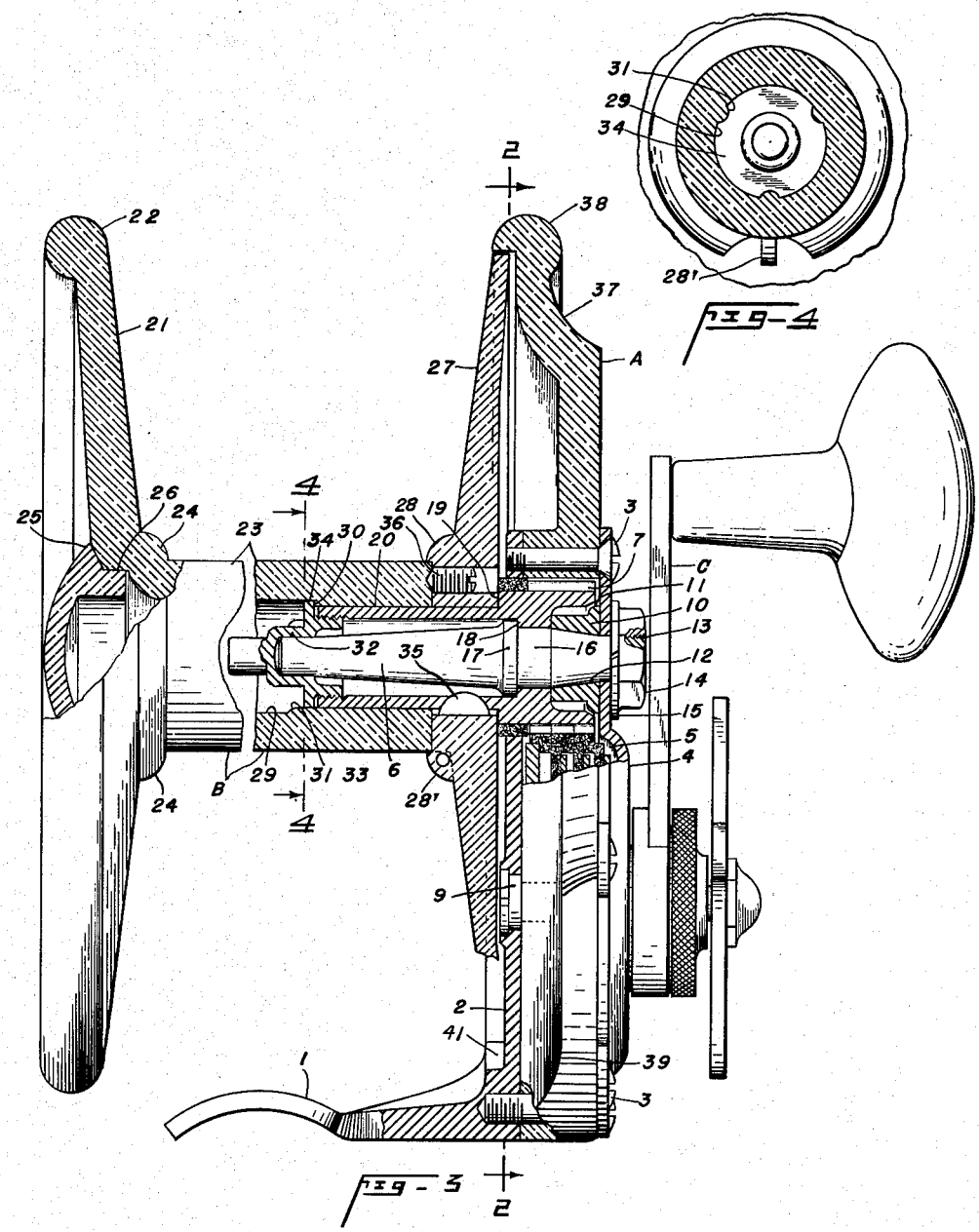
INVENTOR.
Frank A. King Patented Aug. 15, 1950

2,518,903

UNITED STATES PATENT OFFICE 2,518,903

FISH REEL SPOOL MOUNTING

Frank A. King, deceased, late of Los Angeles, Calif., by A. W. Tedstrom, Parsons, Kans., Ernest Lynn King, Los Angeles, Calif., and William Scott King, Los Angeles, Calif., administrators; said administrators assignors to Mary L. King, Tujunga, Calif.

Substituted for abandoned application Serial No. 589,504, April 21, 1945. This application April 2, 1948, Serial No. 18,659

4 Claims. (Cl. 242—84.1)

This invention relates to fishing reels and more particularly to spool mountings and spools therefor and has for an object the provision of a reel structure affording universal strength and minimum weight; this application being substituted for abandoned application Ser. No. 589,504 filed April 21, 1945.

It is among the objects of this invention to provide a reel structure comprising a more simple and durable form of spool and spool support, designed to permit freedom of action about the spool, for coiling off the line by the angler for fly casting and the proper care and manipulation of the line about the spool.

Accordingly an object of this invention resides in the provision of means including a stud shaft spool support having an end bearing located intermediate the spool's ends, thus eliminating the employment of one supporting end plate and the conventional cage-like frame about the spool, which parts tend to interfere with the unsnarling of the line, in the event of an occasional backlash.

Another object of this invention is to provide a new design of line guide, associated with the combination of a bridge plate, reel seat and end plate for the support of the stud shaft, whereby to simplify the general reel construction so the parts may be produced from moldable plastic material, for lightness and economy, yet increase the efficiency of the reel for casting.

Still another object of this invention is to provide a spool structure having a hollow core of ample circumferential area, one end of which core is carried by a short tubular extension of the pinion gear, thus reducing momentum of rotational metal parts to the minimum by eliminating the well known trunnion-ended spool shaft.

Other objects of the invention will become apparent as the detailed description thereof proceeds.

Fig. 1 is an end view of a fishing reel exteriorly of the crank and embodying the present invention, Fig. 2 is a view taken on the line 2—2 of Fig. 3 showing the inner side of the head member, Fig. 3 is a detail cross section of the same embodiment taken on enlarged scale along the line 3—3 of Fig. 1, certain parts being shown in elevation, and Fig. 4 is a detail cross section through the spool, taken along the line 4—4 of Fig. 3.

As shown in the drawing the reel includes a head plate A and a reel seat 1 by which the reel is attached to the rod and in this instance the reel seat 1 is of special form being a left angle integral part of the bridge plate 2 which is attached to the inner side of plate A by means of screws 3.

It will be seen in Figs. 2 and 3 that on the outer side of plate A is a dome-like cover plate 4 which together with plate 2 affords a gear housing for the spool drive and friction clutch mechanism 5.

The screws 3 are passed through apertures in the plate A and threadedly engaged with an annular series of registering threaded apertures in the plate 2, thus securely attaching plates A, 2 and 4 together as a unitary supporting member.

The upper portion of plates 2 and 4 are centrally bored, the latter receiving a stud shaft 6 which supports a spool driving pinion gear 7, and the bore in the bridge plate 2 is of suitable size to receive an oil seal washer 8 along with the gear 7 in assembly.

A crank C and its spool driving mechanism is rotatably retained in plates A, 2 and 4 by means including the bolt 9, for driving the pinion gear 7 and the spool B through the medium of suitable clutch mechanism 5 not fully illustrated herein; as it forms no part of the present invention.

Pinion gear 7 is formed with an outer end recess of suitable depth and diameter to freely receive an abutment collar 10 having a flanged outer end 11 which abuts the inner face of plate 4. Collar 10 is provided with a central bore tapering to less diameter toward the plate 4 which receives the correspondingly tapered outer end 12, of shaft 6, the latter's extremity being threaded as at 13 and threadedly engaged with the hexagon nut 14 abutting the lock washer 15, thus sustaining the stud shaft 6 against lateral stressed with respect to plate 4.

Adjacent the inner end of collar 10 the shaft 6 affords a short section of cylindrical bearing surface 16 and has an annular flange 17 over which is rotatably mounted the pinion gear 7, there being a corresponding internal bearing surface of reduced diameter in the latter, thus providing a retainer shoulder 18 which co-acts with flange 17 to restrain the gear 7 against axial displacement. Inwardly from the bridge plate 2 the gear 7 is reduced in outer diameter thus providing an annular abutment 19 and an inwardly extending hollow shank 20 which carries the spool B.

In this instance the tail end spool flange 21 has a beaded peripheral rim 22 which is circular in cross section, except for its central integral portion, the latter of which converges with a tubular core 23 and at its juncture the core 23 is formed with an inner and outer offset wall forming an outer bead-like fillet 24 and an inner annular recess which is countersunk to receive the beveled head 25 of the hollow plug 26 which is press fitted therein.

Spool B includes an apertured end flange 27 which is seated against the shoulder 19 and formed with a complementary beaded hub 28 including an annular recess corresponding to and receiving the inner end of core 23 so as to give the joint therebetween an integral beaded appearance.

The periphery of the beaded hub 28 is provided with oppositely disposed quadrate shaped recesses which are slightly spaced apart whereby to provide an apertured ear 28' by which the line is attached to the spool.

The core 23 is snugly fitted over the shank 20 and has an enlarged bore portion 29 which forms an intermediary internal shoulder 30 having keys 31 in this instance spaced 120° apart.

Journaled on the reduced inner end of shaft 6 is an externally threaded bearing member 32 threadedly engaged with threads 33 in the shank 20. This bearing 32 affords a radial flange 34 having as shown in Fig. 4, peripheral recesses conforming to and engaging the keys 31, which in assembly is turned as a unit with and against the shoulder 29 and compressed by means of the threads 33 so as to frictionally secure the core 23 against the flange 27, the latter of which is keyed to the shank 20 by means of key 35. Threads 33 being of left hand pitch and the reel shown is of the right hand type, therefore torsional stresses between the core 23 and the flange 27 tend only to more firmly bind the latter parts in their assembled relation.

The hub of flange 27 is provided with an internally threaded aperture wherein is threaded a set screw 36, the latter serving to lock the core 23 against accidental reverse rotational movement with respect to the keyed flange 27.

Obviously if desired the key 35 may be omitted in assembly and headed screws similar to screws 36 may be threadedly engaged with the end of core 23 so as to provide an integrally assembled spool and by this arrangement a preloaded spare spool may quickly be replaced in case the angler prefers a different type of line or in the event of breakage.

As shown in Fig. 1 the outer side of plate A is formed with an inwardly flared portion 37 adjacent its periphery which converges with a peripheral rim 38, similar to rim 22 and this flared portion and the latter converge with the outer boss-like wall forming the gear chamber 5 as at 39.

It will be seen in Figs. 2 and 3, that the inner side of rim 38 is recessed, thus forming an axially projecting lip portion 40, which circumscribes the periphery of flange 27, except for a quadrant shaped recess therein, receiving the bridge plate 2. The inner corner of plate 2 affords a fillet 41 conforming to the lip portion 40, and in assembly the fillet 41, registers with the lip portion 40, thus completing a circular line shield about the spool flange 27.

Obviously rims 22 and 38 serve as bumpers to protect the reel against external shock or strain such as for instance excessive lateral pressure against the rim 38, which is yieldable material whereby, to yield slightly, until the lip 40 strikes the periphery of flange 27 which then arrests such yieldable movement before the resilient limits of the rim 38 is reached.

In this particular instance the crank C functions through the clutch unit 5 to operate the spool and the spool and its bearing 32 is also adaptable to various types of reels.

While there is here shown and described specific embodiments of this invention, the latter is not limited to the exact details of construction set forth, and the invention embraces such changes, modifications and equivalents of the parts and their formation and arrangement as come within the purviews of the appended claims.

What is claimed is:

1. In a fishing reel, including a non-rotatable shaft having a flange adjacent one end thereof, a tubular gear member supported on said shaft and having an internal shoulder abutting said flange, a spool bearing journaled on the other end of said shaft and threadedly engaged with said gear member, a spool fixed for rotation with said gear member, and cooperating elements on said bearing and said spool respectively for retaining the spool on said member.

2. In a fishing reel, a reel seat, a bridge plate carried by said seat, a head plate carried by said bridge plate, said plates having registering openings therein, a cover plate fixed on said head plate, a stud shaft extending through said openings and having one end screw threaded and projected through the cover plate, a nut turned on said screw threaded end to hold said stud shaft in place, a gear, rotatably supported on said stud shaft and disposed in said registering openings, a tubular extension on said gear surrounding said stud shaft, and a spool wholly supported on said extension for rotation therewith.

3. In a fishing reel, a reel seat, a bridge plate carried by said seat, a head plate carried by said bridge plate, said plates having registering openings therein, a cover plate fixed on said head plate, a stud shaft extending through said openings and having one end screw threaded and projected through the cover plate, a nut turned on said screw threaded end to hold said stud shaft in place, a gear, rotatably supported on said stud shaft and disposed in said registering openings, a tubular extension on said gear surrounding said stud shaft, and a spool wholly supported on said extension for rotation therewith, said gear having a recess therein around said shaft and a collar on said shaft seated in said recess.

4. In a fishing reel, a reel seat, a bridge plate carried by said seat, a head plate carried by said bridge plate, said plates having registering openings therein, a cover plate fixed on said head plate, a stud shaft extending through said openings and having one end screw threaded and projected through the cover plate, a nut turned on said screw threaded end to hold said stud shaft in place, a gear, rotatably supported on said stud shaft and disposed in said registering openings, a tubular extension on said gear surrounding said stud shaft, and a spool wholly supported on said extension for rotation therewith, said gear having a recess therein around said shaft and a collar on said shaft seated in said recess, said shaft having a tapered portion on which said collar is mounted, said collar having a correspondingly tapered bore and arranged to abut said gear and said cover plate at its ends.

FRANK A. KING, Deceased.
By A. W. TEDSTROM,
   ERNEST LYNN KING,
   WILLIAM SCOTT KING,
      *Administrators.*

(References on following page)

REFERENCES CITED

The following references are of record in the file of this patent:

UNITED STATES PATENTS

| Number | Name | Date |
|---|---|---|
| 715,274 | Konigsberg | Dec. 9, 1902 |
| 1,284,039 | Atwood | Nov. 5, 1918 |
| 1,612,177 | Catucci | Dec. 28, 1926 |
| 1,855,738 | Case | Apr. 26, 1932 |
| 1,943,981 | Maynes | Jan. 16, 1934 |
| 2,309,146 | Whistler | Jan. 26, 1943 |

FOREIGN PATENTS

| Number | Country | Date |
|---|---|---|
| 23,873 of 1905 | Great Britain | May 3, 1906 |
| 391,925 | Great Britain | May 11, 1933 |